United States Patent [19]
Krayenhagen

[11] Patent Number: 5,730,693
[45] Date of Patent: Mar. 24, 1998

[54] WEB TENSION CONTROL SYSTEM

[76] Inventor: Everett D. Krayenhagen, P.O. Box 411248, Charlotte, N.C. 28241-1248

[21] Appl. No.: 582,204

[22] Filed: Jan. 2, 1996

[51] Int. Cl.[6] .................................................. B23P 15/00
[52] U.S. Cl. ........................ 492/16; 492/22; 492/45
[58] Field of Search ............................ 492/10, 16, 17, 492/18, 20, 22, 45

[56] References Cited

U.S. PATENT DOCUMENTS

| | | | |
|---|---|---|---|
| 3,803,682 | 4/1974 | Stein | 492/16 |
| 5,415,611 | 5/1995 | Krayenhagen | 492/16 |
| 5,451,197 | 9/1995 | Grant | 492/16 |
| 5,522,785 | 6/1996 | Kedl et al. | 492/21 |

*Primary Examiner*—Irene Cuda
*Attorney, Agent, or Firm*—Kennedy Covington Lobdell & Hickman, LLP

[57] ABSTRACT

An improved web tension control system including a shaft and a hollow cylindrical roller mounted on the shaft for rotation about the shaft and for universal pivoting movement relative to the shaft that tends to compensate for variations in the tension of a moving web or substrate passing over the hollow cylindrical roller. The hollow cylindrical roller is mounted on the shaft by a spherical bearing assembly that permits universal pivoting movement of the hollow cylindrical roller relative to the shaft and a roller bearing assembly positioned between the outer surface of the spherical bearing assembly and the inner cylindrical surface of the hollow cylindrical roller to permit free relative rotation of the roller about the shaft. In an alternate embodiment, slots may be formed in the abutting spherical surfaces of the spherical bearing assembly, and an insertable wafer can be placed in such slots to selectively limit the pivoting movement of the hollow cylindrical roller.

4 Claims, 4 Drawing Sheets

WEB TENSION CONTROL SYSTEM

BACKGROUND OF THE INVENTION

The present invention relates generally to a control system for controlling the tension in a moving web, and more particularly to such a system in which an idler roller over which web passes is arranged for movement that tends to equalize the tension across the width of the moving web.

In a variety of manufacturing processes, a continuous web or substrate of material is moved to, through and from desired processing locations, and in most such applications the moving web must change directions in going from one processing location to another and the web is typically passed about rotating cylindrical idler rollers at the points where its direction of movement is changed. As explained in greater detail in my U.S. Pat. No. 5,415,611, uneven tension in the moving web or substrate is a common problem that can be created by a number of different causes, and this uneven tension can have serious adverse consequences if it is not properly controlled, such as causing warp in paper substrates or weaving in other continuous webs or belts.

In many such manufacturing processes, tension in the web can be effectively equalized with a web tension control system of the type described and claimed in my aforesaid patent where, briefly summarized, the outer cylindrical roller of the system is mounted for pivotal movement in one plane about an axis perpendicular to the axis of rotation of central shaft of the tension control system. However, it has been found that in some applications, pivotal movement of the outer cylindrical roller in only one plane may not be sufficient to compensate for the unequal tension in the web.

In accordance with the present invention, an improved tension control system is provided which permits universal pivotal movement of the outer cylindrical roller with respect to its central shaft and which is versatile enough to provide more limited pivotal movement of the outer cylindrical roller, where desired, by making a simple adjustment in the system.

SUMMARY OF THE INVENTION

The present invention provides a tension control system comprising a hollow cylindrical roller having an exterior surface engagable with a moving web and a shaft disposed within said hollow roller, such shaft having opposite end portions. A spherical bearing assembly is mounted on the shaft between the opposite ends thereof, and the bearing assembly includes a first bearing element having an inner surface fitted onto the shaft and an outer truncated spherical bearing surface and includes a second bearing element having an inner truncated spherical surface positioned in sliding abutment with said outer truncated spherical bearing surface of the first bearing element. A roller bearing is mounted between the inner surface of the hollow cylindrical roller and the outer surface of the second bearing element to permit relative rotation of said hollow cylindrical roller about said shaft. By virtue of this arrangement, the moving web can move across the rotating hollow cylindrical roller, and the rotating roller can pivot in all directions relative to the shaft to compensate for variations in tension in the moving web.

In an alternate embodiment of the present invention, the outer spherical surface of the first bearing element is formed with a first slot therein, and the inner spherical surface of the second bearing surface is formed with a second slot therein at a location that can be aligned with the first slot. A selectively removable wafer is inserted in the first and second slots to limit the pivoting movement of the hollow cylindrical roller to a predetermined plane of movement. Additionally, if desired, a hole may be provided in the first bearing element to extend between the bottom of the first slot therein to the inner surface of the first bearing element, and a set screw or similar fastener device may be inserted in such hole to engage the shaft and securely mount the bearing assembly on the shaft.

DETAILED DESCRIPTION OF THE PREFERRED EMBODIMENTS

Figure 1:
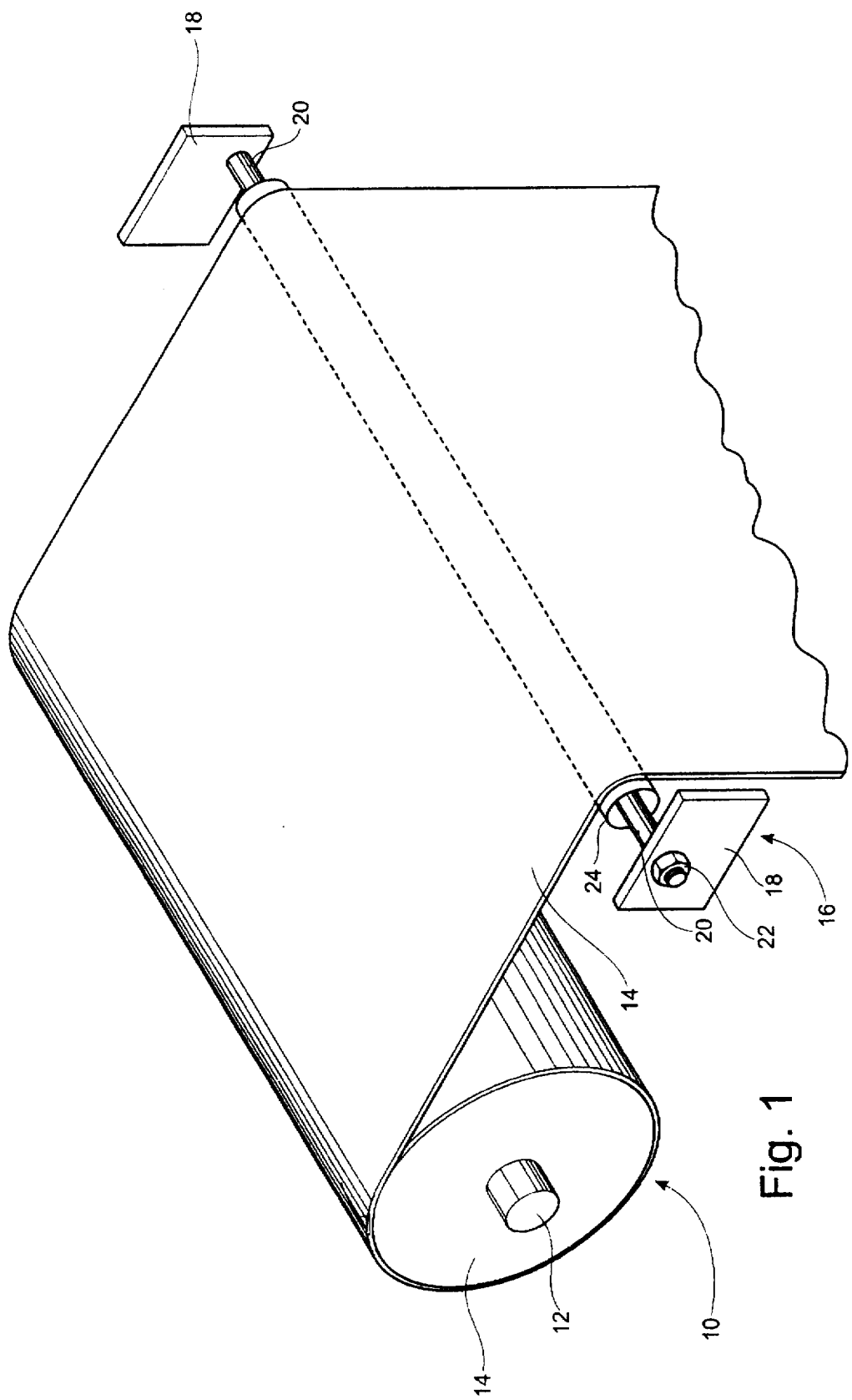
FIG. 1 is a perspective view of a typical application of a web tension control system embodying the present invention.

Looking now in greater detail at the accompanying drawings, FIG. 1 illustrates a typical application of the improved web tension control system of the present invention wherein a supply roll 10 consists of a shaft 12 having a web or substrate 14 wrapped tightly thereabout, and the web 14 is drawn off of the supply roll 10 toward a processing station. The path of the moving web 14 is such that it must change directions at certain points in the processing apparatus, and in the representative application illustrated in FIG. 1 the web makes a 90° change of direction about the web tension control system of the present invention which is generally illustrated by the reference numeral 16.

The web tension control system 16 includes a pair of mounting plates 18, each supporting one end of a shaft 20 that is fixed to the mounting plates by nuts 22, and a hollow cylindrical roller 24 is mounted on the shaft 20 for rotation and for tiltable movement relative to the shaft 20, all as explained in greater detail below, whereby the moving web 14 can pass freely over the exterior surface of the hollow cylindrical roller 24.

Figure 2:
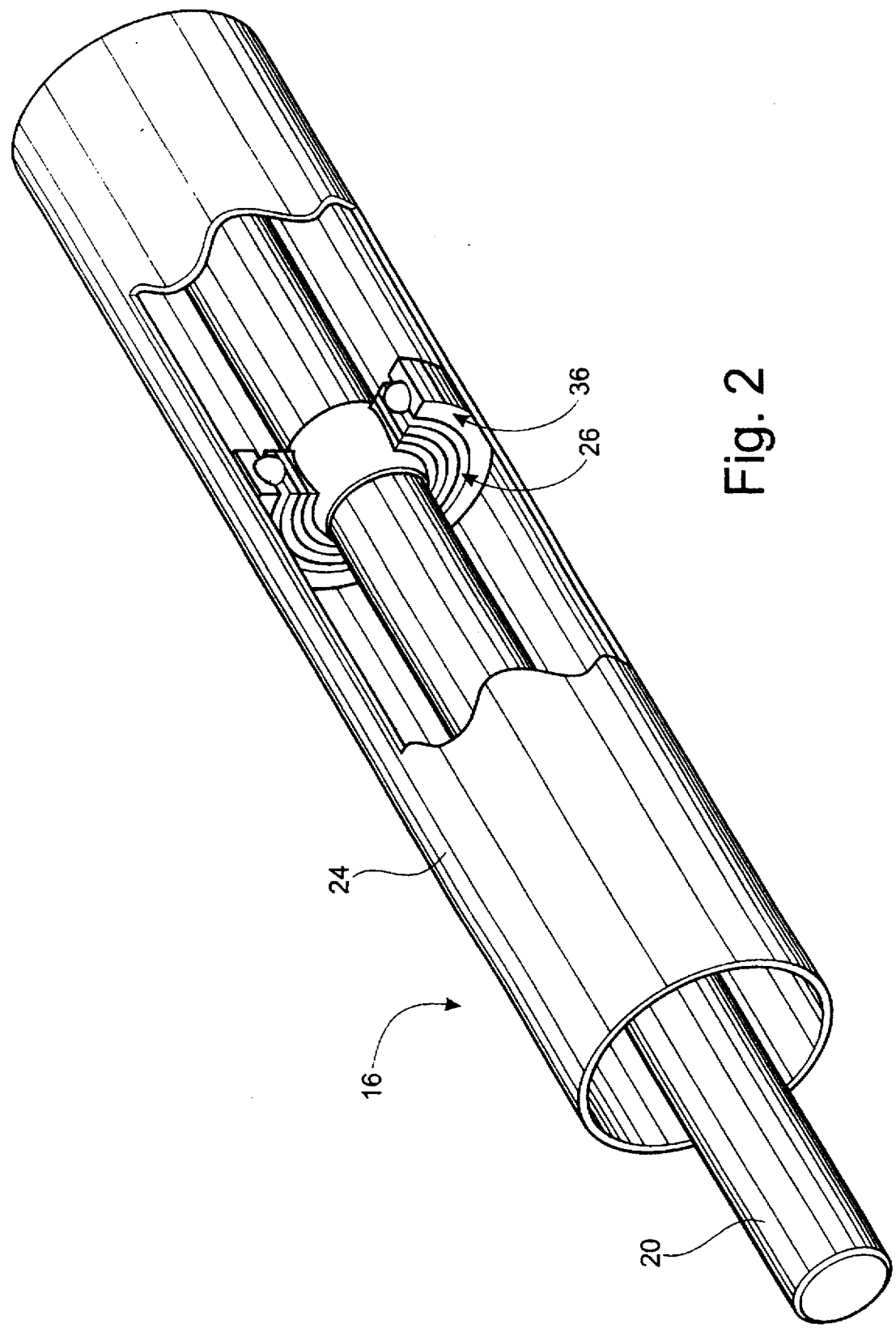
FIG. 2 is perspective view of one embodiment of the web tension control system of the present invention, partially broken away to better illustrate the construction of such system.
Figure 3:
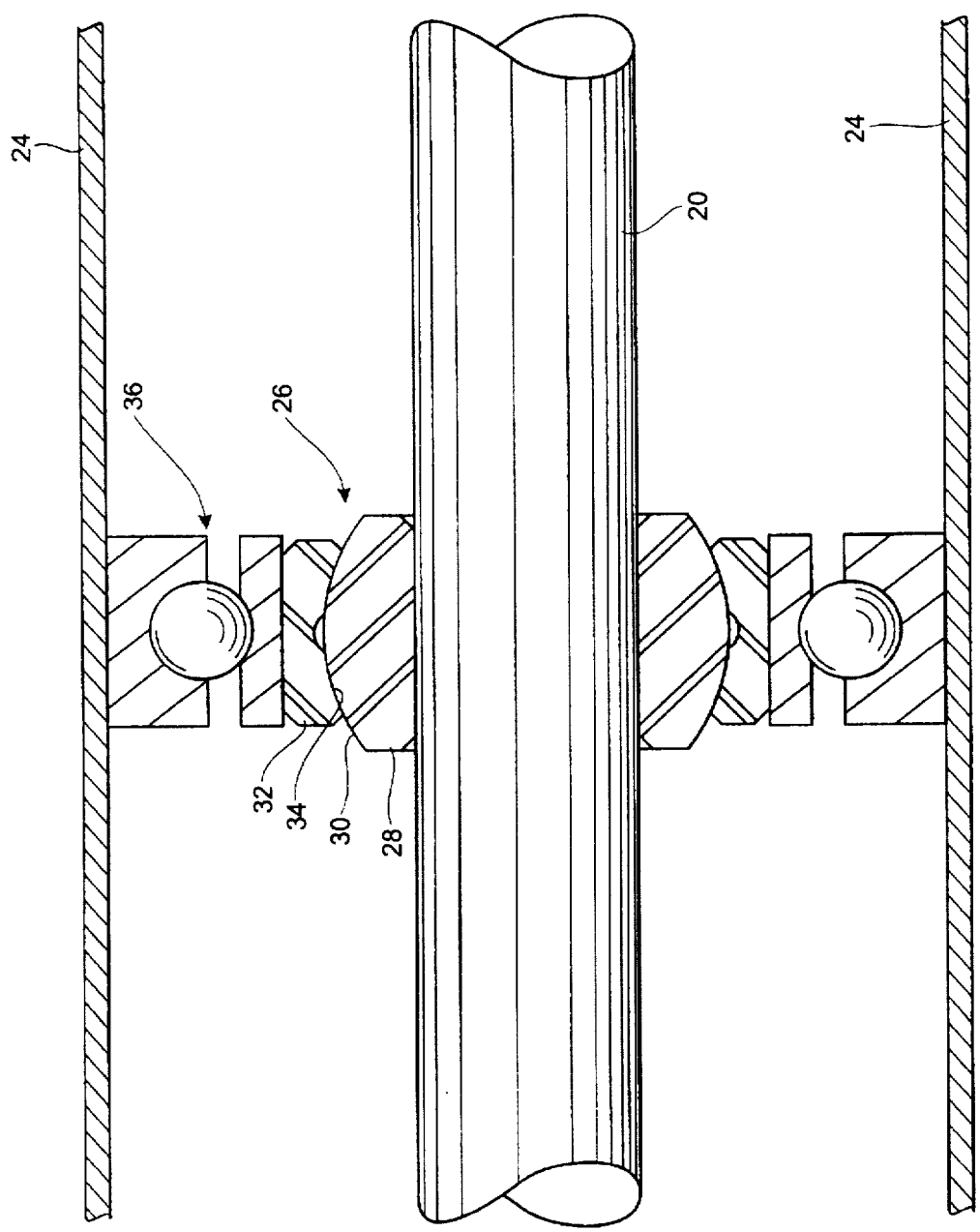
FIG. 3 is vertical section view of the web tension control system illustrated in FIG. 2.

As best seen in FIGS. 2 and 3, a spherical bearing assembly 26 is mounted on the shaft 12, and this spherical bearing assembly 26 includes a first bearing element 28 having an inner surface that is fitted onto the shaft 20, such as by a friction fit or other conventional means, and the first bearing element includes an outer truncated spherical bearing surface 30 (see FIG. 3). The spherical bearing assembly 26 also includes a second bearing element 32 formed with an inner truncated spherical surface 34 positioned in sliding abutment with the outer truncated bearing surface 30 of the first bearing element 28. The outer surface of the second bearing element 32 is cylindrical, and a conventional roller bearing or ball bearing assembly 36 is mounted thereon, and the hollow cylindrical roller 24 is mounted on the outer surface of the ball bearing assembly 36.

By virtue of this arrangement, it will be apparent that the hollow cylindrical roller 24 is freely rotatable about the shaft 20 and therefore acts as a typical idler roller over which the moving web 14 passes as it changes direction about the hollow cylindrical roller 24. Moreover, because the ball bearing assembly 36 is mounted on the outer surface of the spherical bearing assembly 26, the hollow cylindrical roller 24 is free to pivot about the shaft 20 in all directions to compensate for any variations in tension in the moving web 14. More specifically, the abutting truncated spherical surfaces 30,34 are slidable relative to one another in all directions so that the hollow cylindrical roller 24 is universally movable relative to the shaft 20.

Accordingly, if the moving web 14 has variations in tension across its width, the universally movable hollow cylindrical roller 24 makes an adjusting movement relative to the shaft 20 so as to compensate for such variations in tension and generally equalize the tension across the width of the moving web 14, thereby eliminating or substantially reducing stretching or warping of the moving web, or other similar adverse consequences, that result from idler rollers that do not have any provision for compensating for variations in the tension of the moving web, all as explained in greater detail above and in my aforesaid earlier patent.

Additionally, since, in the disclosed embodiment of the present invention in FIGS. 2 and 3, the ball bearing assembly 36 is mounted on the exterior surface of the spherical bearing assembly 26, a smaller and less expensive standard spherical bearing assembly 26 can be used. Moreover, mounting of the ball bearing assembly 36 radially outwardly of the spherical bearing assembly 26 results in the ball bearing assembly 36 having a relatively large radius and a race having a large diameter that accommodates more ball bearings or roller bearings that permit the entire assembly to carry greater loads, and the increased number of ball bearings or roller bearings result in the heat generated by the bearing elements being dissipated more quickly.

Figure 4:
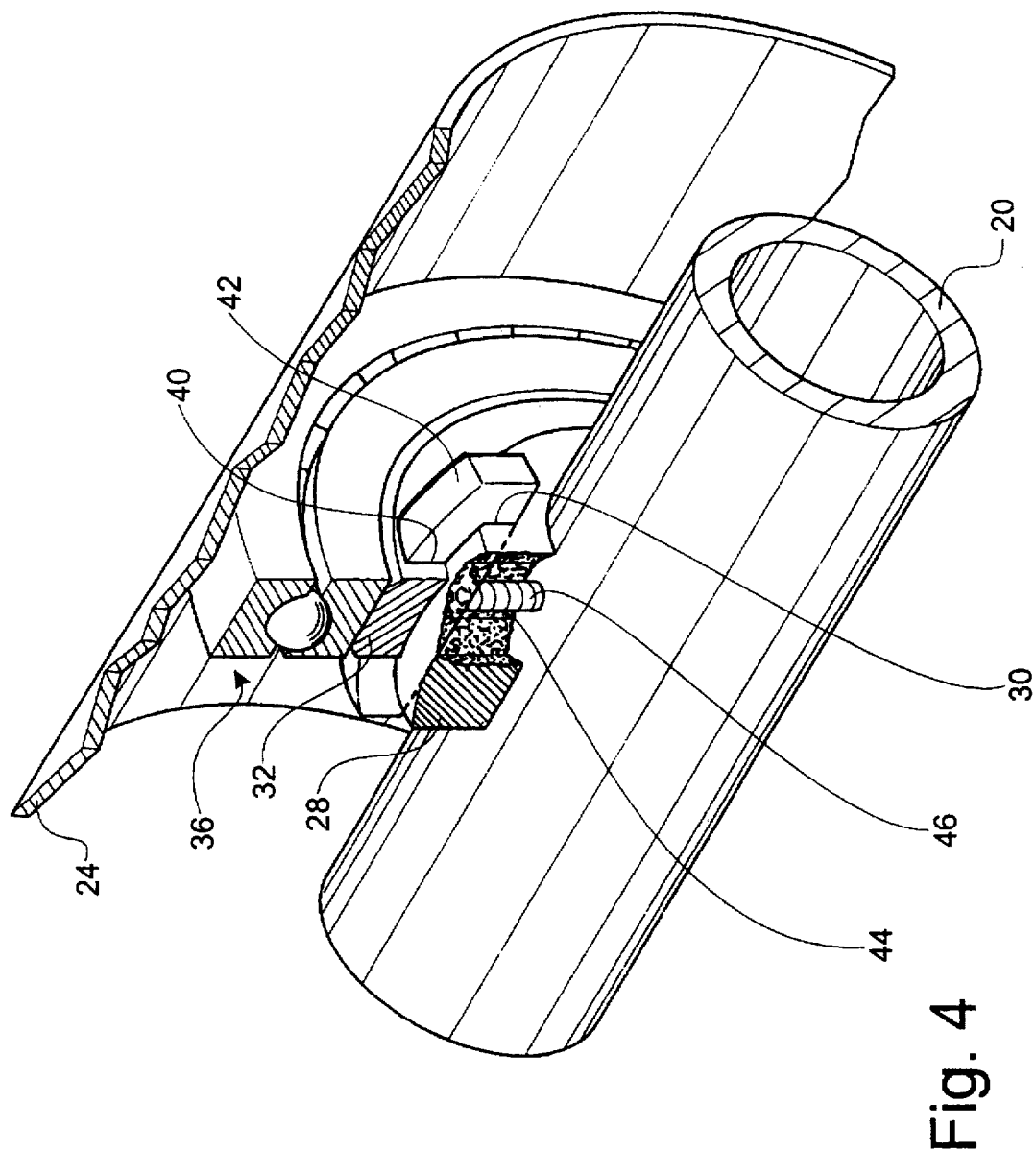
FIG. 4 is a vertical section view similar to FIG. 3 illustrating an alternate embodiment of the present invention.

An alternate embodiment of the present invention is illustrated in FIG. 4, and it is generally similar to the embodiment illustrated in FIGS. 2 and 3 and includes the same reference numerals to identify the same elements described above in connection with FIGS. 2 and 3. However, in this embodiment, the outer truncated spherical bearing surface 30, rather than being continuous, is formed with a relatively narrow slot 38. Similarly, the inner truncated spherical bearing surface 34 is formed with an identical narrow slot 40, and a selectively removable wafer 42 can be inserted in both of the slots 38,40 when they are aligned with one another to thereby limit the movement of the second bearing element 32 relative to the first bearing element 28 to a single, predetermined plane of movement. Thus, if the wafer 42 is removed from the slots 38,40, the second bearing element 32 is universally movable relative to the first bearing element 28 as described above in connection with the embodiment of the present invention illustrated in FIGS. 2 and 3, but, if, in a particular application of the improved web tension control system of the present invention, universal movement of the second bearing element 32 and the outer cylindrical roller 24 is not desirable, the slots 38,40 can be formed in the spherical bearing surfaces 30,34, respectively, at any desired location to permit pivoting movement of the hollow cylindrical roller 24 in a single plane, and about any predetermined pivot axis, depending on the location of the slots 38,40 in their respective bearing surfaces 30,34. For example, where the hollow cylindrical roller 24 must be mounted within the confines of a relatively small housing together with a number of other components, such as in a copying machine, universal pivoting movement of the hollow cylindrical roller 24 could result in its striking other adjacent components or interfering with the proper operation of such components. Accordingly, in these circumstances, it may be desirable to insert the wafer 42 in the aligned slots 38,40 to thereby restrict pivoting movement of the hollow cylindrical roller 34 relative to the shaft 20 to a single plane of movement which, by appropriate design, would avoid any contact or interference with other components located adjacent to the hollow cylindrical roller 24, even though in some circumstances there might be some sacrifice in terms of the ability of the hollow cylindrical roller 24 to accommodate all variations in the tension in the moving web passing thereover.

Finally, it is often desirable to positively secure the spherical bearing assembly 26 to the shaft 20 using a set screw or similar fastener rather than relying solely on the friction fit of the first bearing element 28 on the shaft 20. In these applications, a hole 44 may be drilled through the bottom surface of the slot 38 in the first bearing element 28 to extend all the way to the shaft 20 as illustrated in FIG. 4, and this hole 44 provides a convenient yet effective location for installing a set screw 46 that mechanically joins the spherical bearing assembly 26 and the shaft 20 without affecting the continuity of the outer truncated spherical bearing surface 30 of the first bearing element 28.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A tension control system comprising:
   (a) a hollow cylindrical roller having an exterior surface engageable with a moving web;
   (b) a shaft disposed within said hollow roller, said shaft having opposite end portions;
   (c) a spherical bearing assembly mounted on said shaft between said opposite ends thereof, said bearing assembly including a first bearing element having an inner surface fitted onto said shaft and an outer truncated spherical bearing surface, and including a second bearing element having an inner truncated spherical surface positioned in sliding abutment with said outer truncated spherical bearing surface of said first bearing element; and
   (d) a roller bearing mounted between the inner surface of said hollow cylindrical roller and the outer surface of said second bearing element to permit relative rotation of said hollow cylindrical roller about said shaft, whereby said moving web can move across said rotating hollow cylindrical roller and said rotating roller can pivot in all directions relative to said shaft to compensate for variations in tension in said moving web.

2. A tension control system as defined in claim 1, wherein said outer spherical surface of said first bearing element is formed with a first slot therein, wherein said inner spherical surface of said second bearing surface is formed with a second slot therein at a location that can be aligned with said first slot, and a selectively removable wafer is inserted in said first and second slots to limit said pivoting movement of said hollow cylindrical roller to a predetermined plane of movement.

3. A tension control system as defined in claim 1, wherein said first bearing element is formed with a hole extending from the bottom of said first slot to said inner surface of said first bearing element, and wherein a set screw is positioned in said hole to securely mount said bearing assembly to said shaft.

4. A tension control system comprising:
 (a) a hollow cylindrical roller having an exterior surface engageable with a moving web;
 (b) a shaft disposed within said hollow roller, said shaft having opposite end portions;
 (c) a spherical bearing assembly mounted on said shaft between said opposite ends thereof, said bearing assembly including a first bearing element having an inner surface fitted onto said shaft and an outer truncated spherical bearing surface formed with a first slot therein, and including a second bearing element having an inner truncated spherical surface formed with a second slot therein and positioned in sliding abutment with said outer truncated spherical bearing surface of said first bearing element, said first and second slots being located on said inner and outer spherical bearing surfaces so as to be aligned with one another at one predetermined relative position of said first and second bearing elements;
 (d) a wafer element selectively insertable in said first and second slots when they are aligned with one another; and
 (e) a roller bearing mounted between the inner surface of said hollow cylindrical roller and the outer surface of said second bearing element to permit relative rotation of said hollow cylindrical roller and said shaft, whereby said moving web can move across said rotating hollow cylindrical roller and said roller can pivot in all directions relative to said shaft to compensate for variations in tension in said moving web when said wafer element is removed from said first and second slots, and can pivot in only one predetermined plane relative to said shaft when said wafer element is inserted in said first and second slots.

* * * * *